US012665635B2

(12) United States Patent
Wei et al.

(10) Patent No.: US 12,665,635 B2
(45) Date of Patent: Jun. 23, 2026

(54) USER SCHEDULING METHOD IN MULTI-ANTENNA SIGNAL TRANSMISSION, AND ELECTRONIC DEVICE AND STORAGE MEDIUM

(71) Applicant: ZTE CORPORATION, Shenzhen (CN)

(72) Inventors: Hao Wei, Shenzhen (CN); Jingyue Huang, Shenzhen (CN); Zheng Zheng, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 172 days.

(21) Appl. No.: 18/692,329

(22) PCT Filed: Sep. 16, 2022

(86) PCT No.: PCT/CN2022/119342
§ 371 (c)(1),
(2) Date: Sep. 3, 2024

(87) PCT Pub. No.: WO2023/041045
PCT Pub. Date: Mar. 23, 2023

(65) Prior Publication Data
US 2025/0038793 A1 Jan. 30, 2025

(30) Foreign Application Priority Data
Sep. 18, 2021 (CN) .......................... 202111101818.9

(51) Int. Cl.
*H04L 23/02* (2006.01)
*H04B 7/0452* (2017.01)
*H04L 25/02* (2006.01)

(52) U.S. Cl.
CPC ....... *H04B 7/0452* (2013.01); *H04L 25/0204* (2013.01); *H04L 25/021* (2013.01); *H04L 25/0246* (2013.01)

(58) Field of Classification Search
CPC .. H04B 7/0452; H04B 7/0617; H04B 17/309; H04B 17/318; H04B 7/0634;
(Continued)

(56) References Cited

U.S. PATENT DOCUMENTS

2009/0270118 A1* 10/2009 Jin ....................... H04B 7/0617
375/267
2013/0022143 A1* 1/2013 Ko ....................... H04B 7/0634
375/267
(Continued)

FOREIGN PATENT DOCUMENTS

CN 1829113 A 9/2006
CN 103532607 A 1/2014
(Continued)

OTHER PUBLICATIONS (ISA/237) Written Opinion of the International Searching Authority dated Dec. 15, 2022.
(Continued)

*Primary Examiner* — Khai Tran
(74) *Attorney, Agent, or Firm* — NZ Carr Law Office

(57) ABSTRACT

The embodiments of the present application relate to the technical field of communications. Disclosed are a user scheduling method in multi-antenna signal transmission, and an electronic device and a storage medium. The method comprises: acquiring channel information of channels that are used by a plurality of users, and according to the channel information of the channels that are used by the users, constructing a channel information covariance corresponding to each user; calculating a correlation coefficient
(Continued)

between every two users according to the channel information covariance of each user; and selecting a scheduled user on the basis of the number of scheduled users and the correlation coefficient between every two users.

10 Claims, 6 Drawing Sheets

(58) Field of Classification Search
CPC . H04W 72/121; H04W 16/28; H04W 52/267; H04L 5/0037; H04L 15/021
USPC ................................. 375/262, 260, 267, 299
See application file for complete search history.

(56) References Cited

U.S. PATENT DOCUMENTS

| | | | |
|---|---|---|---|
| 2015/0372727 A1 | 12/2015 | Ribeiro et al. | |
| 2019/0215050 A1* | 7/2019 | Kumagai | ............. H04B 7/0617 |
| 2022/0279535 A1* | 9/2022 | Tsui | .................... H04B 7/0695 |

FOREIGN PATENT DOCUMENTS

| CN | 105262524 A | 1/2016 |
|---|---|---|
| CN | 107070624 A | 8/2017 |
| CN | 105554899 B | 6/2019 |

OTHER PUBLICATIONS

The international search report of the corresponding PCT Application No. PCT/CN2022/119342 mailed on Dec. 15, 2022 along with English translation thereof.
EESR of the corresponding EP Patent Application No. 22869411.3 dated Nov. 12, 2024.
Bashar Manijehetal:"Evaluation of Low Complexity Massive MIMO Techniques Under Realistic Channel Conditions", IEEE Transactionson Vehicular Technology IEEE, USA, vol. 68 , No. 9, Sep. 1, 2019 (Sep. 1, 2019) , pp. 9297-9302 XP011746004, ISSN:0018-9545 , DOI: 10.1109/TVT.2019.2927095 [retrieved on Sep. 16, 2019] section: summary of invention.

* cited by examiner

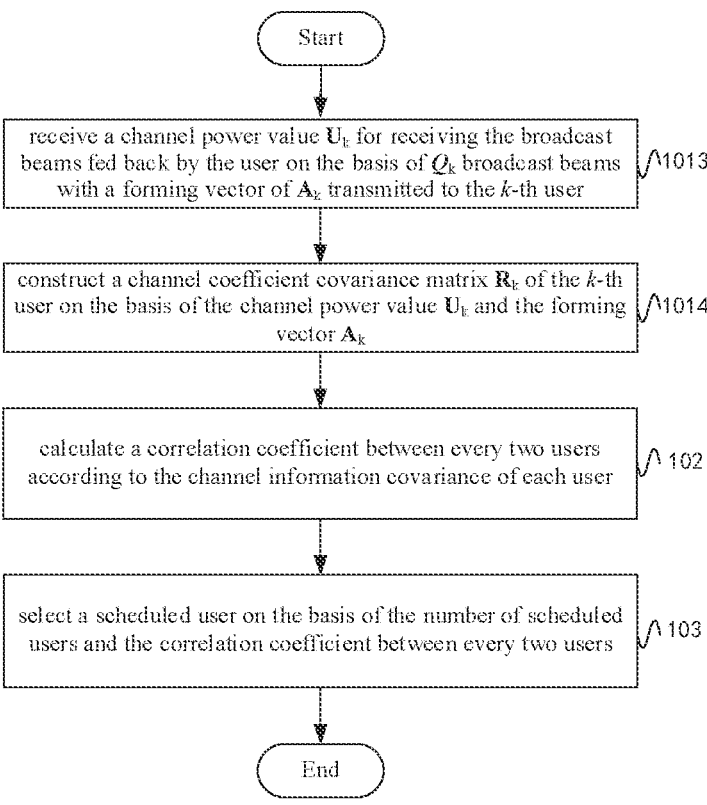

Start receive a channel power value $U_k$ for receiving the broadcast beams fed back by the user on the basis of $Q_k$ broadcast beams with a forming vector of $A_k$ transmitted to the $k$-th user     M1013 construct a channel coefficient covariance matrix $R_k$ of the $k$-th user on the basis of the channel power value $U_k$ and the forming vector $A_k$     M1014 calculate a correlation coefficient between every two users according to the channel information covariance of each user     102 select a scheduled user on the basis of the number of scheduled users and the correlation coefficient between every two users     103

End

FIG. 3

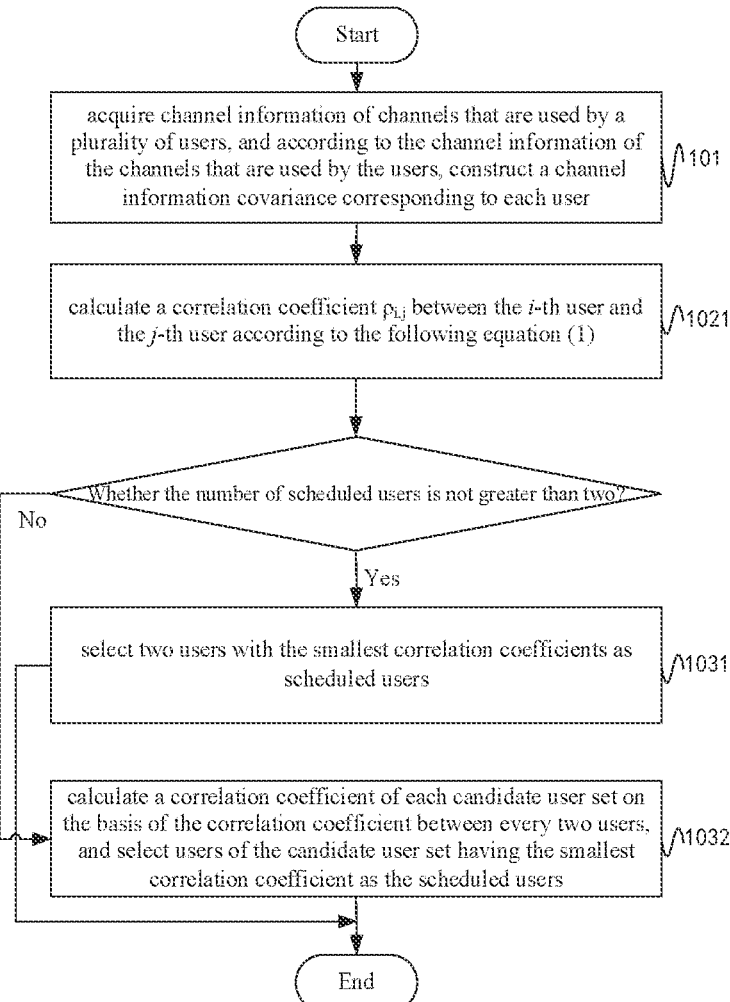

Start acquire channel information of channels that are used by a
plurality of users, and according to the channel information of
the channels that are used by the users, construct a channel
information covariance corresponding to each user          101 calculate a correlation coefficient $\rho_{i,j}$ between the $i$-th user and
the $j$-th user according to the following equation (1)          1021

Whether the number of scheduled users is not greater than two?

No

Yes select two users with the smallest correlation coefficients as
scheduled users          1031 calculate a correlation coefficient of each candidate user set on
the basis of the correlation coefficient between every two users,
and select users of the candidate user set having the smallest
correlation coefficient as the scheduled users          1032

End

FIG. 5

USER SCHEDULING METHOD IN MULTI-ANTENNA SIGNAL TRANSMISSION, AND ELECTRONIC DEVICE AND STORAGE MEDIUM

CROSS-REFERENCE TO RELATED APPLICATIONS

The present application is corresponding to the International Application No. PCT/CN2022119342, filed on Sep. 16, 2022, which claims priority to Chinese Patent Application No. 202111101818.9, filed on Sep. 18, 2021, the entire content of which is incorporated herein by reference.

TECHNICAL FIELD

The present application relates to the technical field of communication, and particularly to a user scheduling method in multi-antenna signal transmission, an electronic device and a storage medium.

BACKGROUND

Multi-antenna technology is widely used in wireless communication to achieve higher spectrum usage efficiency, and a Base Station (BS) can simultaneously serve multiple users on the same time-frequency resource, i.e., multi-user multi-antenna transmission technology. Therefore, it is increasingly important to fully utilize radio spectrum resources for proper scheduling and resource allocation among users to achieve better system capacity.

In some instances, the way adopted by the industry is that a base station classifies and schedules users according to system accessibility and rate, the orthogonality between users, and spatial distance grouping and clustering, which requires a large number of complex matrix decomposition and iterative search calculation processes, and implementation complexity is high.

SUMMARY

An object of embodiments of the present disclosure is to provide a user scheduling method in multi-antenna signal transmission, an electronic device and a storage medium, which solve the problem of high design complexity of a base station in scheduling transmission of users in multi-user multi-antenna signal transmission communication.

To solve the above technical problem, embodiments of the present application provide a user scheduling method in multi-antenna signal transmission, the method being applied to a base station, which may include: acquiring channel information of channels that are used by a plurality of users, and according to the channel information of the channels that are used by the users, constructing a channel information covariance corresponding to each user; calculating a correlation coefficient between every two users according to the channel information covariance of each user; and selecting a scheduled user on the basis of the number of scheduled users and the correlation coefficient between every two users.

An embodiment of the present application further provides an electronic device, which may include: at least one processor; and, a memory communicatively connected with the at least one processor; wherein, the memory stores instructions executable by the at least one processor, the instructions executed by the at least one processor to enable the at least one processor to perform the user scheduling method in multi-antenna signal transmission as described above.

An embodiment of the present application further provides a non-transitory computer-readable storage medium storing a computer program which, when executed by a processor, implements the user scheduling method in multi-antenna signal transmission as described above.

BRIEF DESCRIPTION OF FIGURES

FIG. 3 is a detailed flowchart 3 of a user scheduling method in multi-antenna signal transmission according to an embodiment of the present application;

FIG. 5 is a detailed flowchart 5 of a user scheduling method in multi-antenna signal transmission according to an embodiment of the present application.

DETAILED DESCRIPTION

In order to make the objects, technical solutions and advantages of the embodiments of the present application clearer, the embodiments of the present application will be described in detail below with reference to the accompanying drawings. However, those of ordinary skill in the art can appreciate that in the various embodiments of the present application, numerous technical details are set forth in order to provide the reader with a better understanding of the present application. However, the claimed technical solution can be implemented without these technical details and with various variations and modifications on the basis of the following embodiments.

An embodiment of the present application relates to a user scheduling method in multi-antenna signal transmission, and the method can be applied to a base station (BS).

Figure 1:
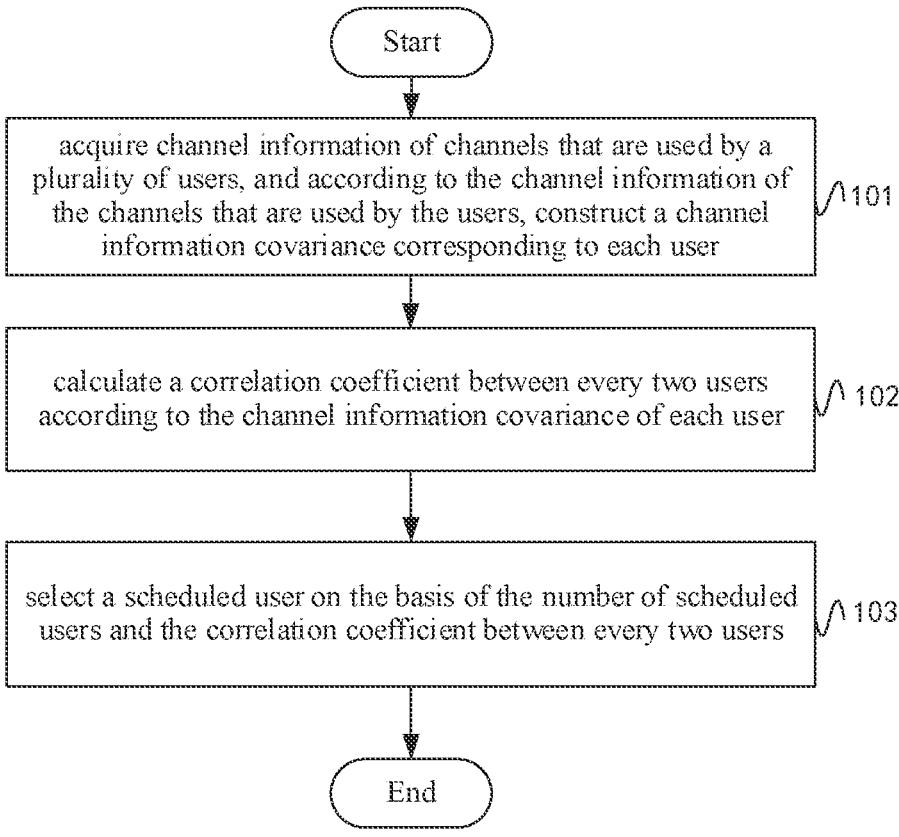
FIG. 1 is a detailed flowchart 1 of a user scheduling method in multi-antenna signal transmission according to an embodiment of the present application.

As shown in FIG. 1, the present embodiment provides a user scheduling method in multi-antenna signal transmission, including the following steps.

At step 101: channel information of channels that are used by a plurality of users is acquired, and according to the channel information of the channels that are used by the users, a channel information covariance is constructed corresponding to each user.

Wherein, a channel used by a user is a transmission path used between a User Equipment (UE) and a BS to transmit signals. The BS can simultaneously serve multiple users on the same time-frequency resource using the multi-user multi-antenna transmission technology. Each of the UE and BS is configured with a plurality of antennas for transmitting signals.

The channel information may include, but is not limited to, any one of an uplink channel coefficient matrix, a channel forming vector and a corresponding channel power value thereof, and a matrix codebook of a downlink channel.

Specifically, the manner in which the channel information is acquired is not limited in this embodiment, and the acquired channel information can be described in the form of a matrix. After the channel information is obtained, a channel information covariance of a channel used by each user is calculated, and the channel information covariance is logged as a channel information covariance corresponding to the corresponding user. Each user corresponds to a channel information covariance, and the channel information covariance is continuously updated as the channel information changes.

At step 102: a correlation coefficient between every two users is calculated according to the channel information covariance of each user.

Specifically, for two channel information covariances corresponding to two users, a correlation coefficient between the two channel information covariances is calculated, and then the correlation coefficient is taken as the correlation coefficient between the two users. The calculation method for calculating the correlation coefficient between the two channel information covariances is not limited in this embodiment.

At step 103: a scheduled user is selected on the basis of the number of scheduled users and the correlation coefficient between every two users.

Specifically, the principle of selecting scheduled users is to select users with low correlation between users as scheduled users as possible, and on the basis of a given number of scheduled users, users with low correlation between users and with a given number of scheduled users can be selected from existing users as scheduled users. The present embodiment does not limit the calculation method for selecting scheduled users on the basis of the number of scheduled users and the correlation coefficient between every two users, as long as the principle that the correlation of the selected scheduled users as a whole is low is followed.

Compared with the related art, in the present embodiment, channel information of channels that are used by a plurality of users is acquired, and according to the channel information of the channels that are used by the users, a channel information covariance is constructed corresponding to each user; a correlation coefficient between every two users is calculated according to the channel information covariance of each user; and a scheduled user is selected on the basis of the number of scheduled users and the correlation coefficient between every two users. The correlation coefficient between the users is calculated by employing statistical information of the channel information covariance of a channel used by each user, a relatively stable result of correlation between users can be obtained, so that the user is selected for scheduling on the basis of the correlation between users, and at the same time, the candidate scheduling solution is simple to implement and can effectively save computing resources.

Figure 2:
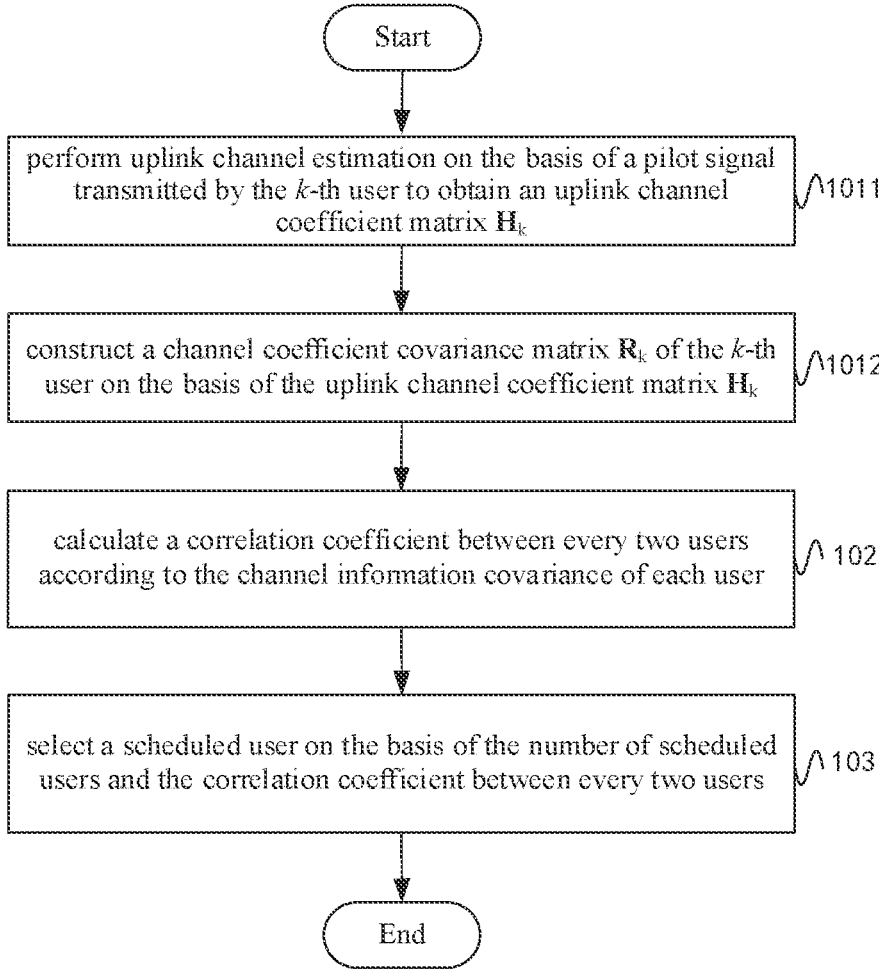
FIG. 2 is a detailed flowchart 2 of a user scheduling method in multi-antenna signal transmission according to an embodiment of the present application.

Another embodiment of the present application relates to a user scheduling method in multi-antenna signal transmission. In this embodiment, an uplink channel coefficient matrix is used as channel information, an uplink channel is estimated by the base station on the basis of a pilot signal transmitted by the user, and the channel information covariance corresponding to each user is obtained. Accordingly, as shown in FIG. 2, the above step 101 may specifically include the following sub-steps.

At sub-step 1011: uplink channel estimation is performed on the basis of a pilot signal transmitted by the k-th user to obtain an uplink channel coefficient matrix $H_k \in C^{N_{BS} \times N_k}$, wherein: $0 < N_k \leq N_{UE}$, $N_{BS}$ is the number of antennas configured on a base station, and $N_{UE}$ is the number of antennas configured on a user equipment.

For example, the number of UEs is set to be K=8, each UE is configured with $N_{UE}$=4 antennas, and the BS is configured with $N_{BS}$=64 antennas. The number of scheduled users is D=2.

It is assumed that the base station estimates the uplink channel from the UE to the BS on the basis of the pilot signal transmitted by the k-th user, an uplink channel coefficient matrix $H_k \in C^{N_{BS} \times N_k}$ is obtained, wherein $0 < N_k \leq N_{UE}$, which represents that the number of antennas for uplink transmission of the pilot signal transmitted by the k-th user may be smaller than the number of antennas actually configured for the UE. The uplink channel coefficient matrix $H_k$ is taken in this embodiment as the channel coefficient matrix corresponding to the corresponding user.

At sub-step 1012: a channel coefficient covariance matrix $$R_k = H_k H_k^H$$

of the k-th user is constructed on the basis of the uplink channel coefficient matrix $$H_k, \text{ wherein, } H_k^H$$

is a conjugate transpose matrix of $H_k$.

Specifically, the base station constructs the channel information covariance matrix $$R_k = H_k H_k^H$$

for the k-th user on the basis of the uplink channel coefficient matrix corresponding to the UE of the k-th user, wherein:

$$H_k^H$$

is a conjugate transpose matrix of $H_k$.

Compared with the related art, the present embodiment performs uplink channel estimation on the basis of the pilot signal transmitted by the k-th user to obtain the uplink channel coefficient matrix $H_k$, and then constructs a channel coefficient covariance matrix $R_k$ of the k-th user on the basis of the uplink channel coefficient matrix $H_k$, thereby providing a specific way of calculating the channel coefficient covariance matrix $R_k$.

Another embodiment of the present application relates to a user scheduling method in multi-antenna signal transmission. In this embodiment, the channel forming vector and the corresponding channel power value thereof are used as channel information, and the base station obtains the channel power value fed back by the user by transmitting the broadcast beams to the user, thereby obtaining the channel coefficient covariance matrix corresponding to each user on the basis of the channel power value and the forming vector of the broadcast beams. Accordingly, as shown in FIG. 3, the above step 101 may specifically include the following sub-steps.

At sub-step 1013: a channel power value $U_k$=diag $(u_1, \ldots, u_{Q_k})$ for receiving the broadcast beams fed back by the user is received on the basis of $Q_k$ broadcast beams with a forming vector of $A_k=[a_1, \ldots, a_{Q_k}] \in C^{N_{BS} \times Q_k}$ transmitted to the k-th user; wherein: $N_{BS}$ is the number of antennas configured on the base station.

For example, the number of UEs is set to be K=8, each UE is configured with $N_{UE}=4$ antennas, and the BS is configured with $N_{BS}=64$ antennas. The number of scheduled users is D=2.

Specifically, it is assumed that the base station transmits $Q_k$ broadcast beams to the k-th user, and a forming vector of the beams is $A_k=[a_1, \ldots, a_{Q_k}] \in C^{N_{BS} \times Q_k}$, wherein: $N_{BS}$ is the number of antennas configured at the base station and $a_i$, i=1, 2, ..., Q is the forming vector of the i-th broadcast beam. The user respectively feeds back the corresponding received channel power values $U_k=\text{diag}(u_1, \ldots, u_{Q_k})$ after receiving the broadcast beams. Wherein, $u_i$, i=1, 2, ..., Q is a received channel power value vector for receiving the i-th broadcast beam and diag(•) is a diagonal matrix. The channel power value $U_k$ is used in this embodiment as the channel coefficient matrix for the channel used by the corresponding user.

At sub-step 1014: a channel coefficient covariance matrix $$R_k = A_k U_k A_k^H$$

of the k-th user is constructed on the basis of the channel power value $U_k$ and the forming vector $A_k$, wherein:

$$A_k^H$$

is a conjugate transpose matrix of $A_k$. Specifically, the base station constructs a channel information covariance matrix $$R_k = A_k U_k A_k^H$$

of the k-th user on the basis of the received channel power value $U_k$ fed back by the k-th user after receiving the broadcast beams, wherein:

$$A_k^H$$

is a conjugate transpose matrix of $A_k$.

Compared with the related art, the present embodiment provides a specific way of calculating the channel coefficient covariance matrix $R_k$ on the basis of obtaining the channel power value $U_k$ of the received broadcast beams fed back by the user after transmitting the broadcast beams $A_k$ to the k-th user, and then constructing the channel coefficient covariance matrix $R_k$ of the k-th user on the basis of the broadcast beams $A_k$ and the channel power value $U_k$.

Another embodiment of the present application relates to a user scheduling method in multi-antenna signal transmission. In this embodiment, a matrix codebook of a downlink channel is used as channel information, and the base station obtains a matrix codebook of a downlink channel fed back by the user by transmitting a downlink channel measurement pilot signal to the user, thereby obtaining a channel coefficient covariance matrix corresponding to each user on the basis of the matrix codebook of the downlink channel.

Figure 4:
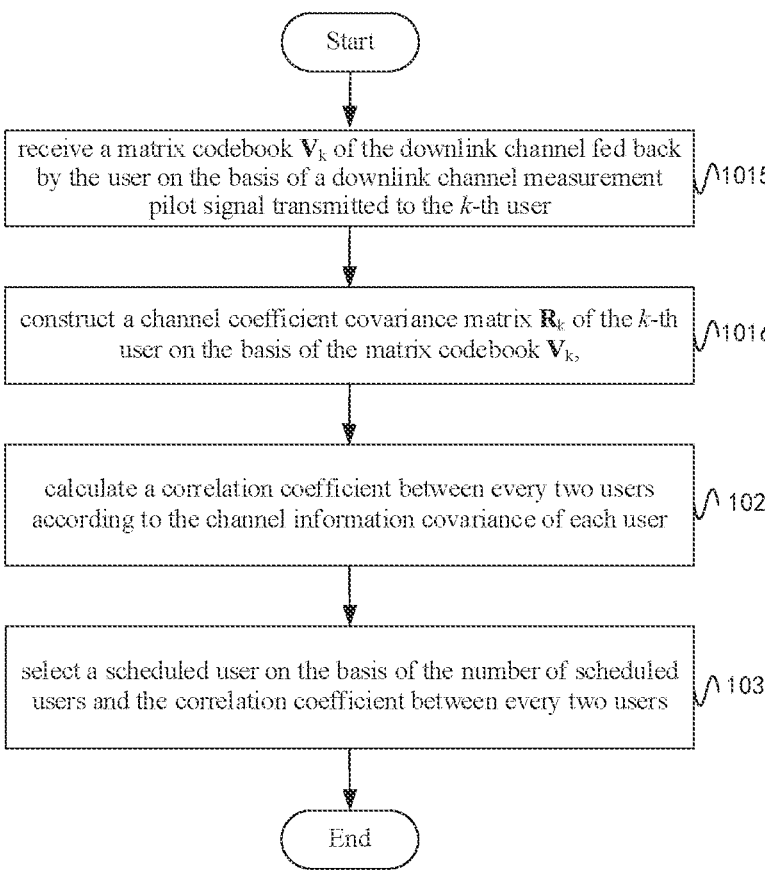
FIG. 4 is a detailed flowchart 4 of a user scheduling method in multi-antenna signal transmission according to an embodiment of the present application.

Accordingly, as shown in FIG. 4, the above step 101 may specifically include the following sub-steps.

At sub-step 1015: a matrix codebook $V_k \in C^{L_k \times N_{BS}}$ of the downlink channel fed back by the user is received on the basis of a downlink channel measurement pilot signal transmitted to the k-th user, wherein: $0 < L_k \leq N_{UE}$, $N_{BS}$ is the number of antennas configured on the base station, and $N_{UE}$ is the number of antennas configured on the user equipment.

For example, the number of UEs is set to be K=8, each UE is configured with $N_{UE}=4$ antennas, and the BS is configured with $N_{BS}=64$ antennas. The number of scheduled users is D=2.

Specifically, it is assumed that the base station transmits a downlink channel measurement pilot signal to the k-th user, the user feeds back a corresponding downlink channel matrix codebook $V_k \in C^{L_k \times N_{BS}}$, wherein $0 < L_k \leq N_{UE}$, which represents that the number of matrix direction vectors fed back by the k-th user may be smaller than the number of antennas actually configured for the UE. The uplink channel coefficient matrix codebook $V_k$ is taken in this embodiment as the channel coefficient matrix for the corresponding user channel.

At sub-step 1016: a channel coefficient covariance matrix $$R_k = V_k^H V_k$$

of the k-th user is constructed on the basis of the matrix codebook $$V_k, \text{wherein: } V_k^H$$

is a conjugate transpose matrix of $V_k$.

The base station constructs the channel information covariance matrix $$R_k = V_k^H V_k$$

for the k-th user on the basis of the user channel information. Specifically, the base station constructs the channel information covariance matrix $$R_k = V_k^H V_k$$

for the k-th user on the basis of the downlink channel matrix codebook $V_k$ fed back by the k-th user after receiving the downlink channel measurement pilot signal, wherein:

$$V_k^H$$

is the conjugate transpose matrix of $V_k$.

Compared with the related art, the present embodiment provides a specific way of calculating the channel coefficient covariance matrix $R_k$ on the basis of obtaining the downlink channel matrix codebook $V_k$ fed back by the user after transmitting the downlink channel measurement pilot signal to the k-th user, and then constructing the channel coefficient covariance matrix $R_k$ of the k-th user on the basis of the downlink channel matrix codebook $V_k$.

Another embodiment of the present application relates to a user scheduling method in multi-antenna signal transmission. The present embodiment shows a specific calculation method of calculating the correlation coefficient between every two users on the basis of the channel information covariance (e.g., the channel coefficient covariance matrix) of each user, and how to select a scheduled user. Accordingly, as shown in FIG. 5, the above step 102 may specifically include the following sub-steps.

At sub-step 1021: a correlation coefficient $\rho_{i,j}$ between the i-th user and the j-th user is calculated according to the following equation (1).

$$\rho_{i,j} = \frac{tr(R_i R_j^H)}{\|R_i\|_F \|R_j\|_F} \quad (1)$$

wherein tr(•) represents the trace of the matrix, $\|\bullet\|_F$ represents the norm of the matrix, and $R_i$ and $R_j$ are the channel information covariances corresponding to the i-th user and the j-th user, respectively.

Specifically, after the base station obtains the channel coefficient covariance matrices corresponding to the respective users, the base station calculates the correlation coefficient between every two users according to the correlation of the channel coefficient covariance matrices. The correlation coefficient between the i-th user and the j-th user may be expressed by Equation (1). $R_i$ and $R_j$ are the channel coefficient covariance matrices corresponding to the i-th user and the j-th user, respectively. At the same time, $\rho_{i,j} = \rho_{j,i}$ is also satisfied. By using the statistical information of the channel coefficient covariance matrix to calculate the correlation coefficient between users, relatively stable results can be obtained.

On this basis, as shown in FIG. 5, the above step 103 may specifically include the following sub-steps.

Whether the number of scheduled users is not greater than two is judged; if the judgment result is yes, sub-step 1031 is entered; if the judgment result is no, sub-step 1032 is entered.

At Sub-step 1031: two users with the smallest correlation coefficients are selected as scheduled users.

Specifically, when the number of scheduled users is not greater than 2, at most two users may be selected as scheduled users in order to achieve utilization of time-frequency resources. Following the principle that the correlation between scheduled users is low, the two users with the smallest correlation coefficient calculated according to the channel coefficient covariance matrix corresponding to each user may be selected as the scheduled users.

At sub-step 1032: a correlation coefficient of each candidate user set is calculated on the basis of the correlation coefficient between every two users, and users of the candidate user set with the smallest correlation coefficient are selected as the scheduled users.

Specifically, when the number of scheduled users is greater than 2, all candidate user sets may be constructed on the basis of the number of currently existing users and the number of scheduled users, and the number of users included in each candidate user set is the number of scheduled users. A correlation coefficient between every two users is then calculated for the users included in each candidate user set, and a correlation coefficient for the corresponding candidate user set is calculated on the basis of the correlation coefficient between every two users. The lower the correlation coefficient corresponds to a lower overall correlation between users in the candidate user set. Selecting the users in the candidate user set with the smallest correlation coefficient as the scheduled users may reduce interference between scheduled users on the signal transmission.

In one example, in sub-step 1032, the content that the correlation coefficient for each candidate user set is calculated on the basis of the correlation coefficient between every two users may include the following steps.

Step 1:

$$C_K^D$$

candidate scheduling solutions are constructed on the basis of the total number K of existing users and the number D of scheduled users, and the users contained in each candidate scheduling solution forming one candidate user set.

For example, the number of UEs is set to be K=8, each UE is configured with $N_{UE}=4$ antennas, and the BS is configured with $N_{BS}=64$ antennas. The number of scheduled users is $$D = 3 \cdot C_K^D$$

combinations of users may be obtained on the basis of the permutation and combination in probability, each combination of users corresponding to one candidate scheduling solution, and the users included in each candidate scheduling solution form a candidate user set.

Step 2: a geometric mean $$\rho_{\Theta_d^D} = \left( \prod_{i,j \in \Theta_d^D} \rho_{i,j} \right)^{1/C_D^2}$$

of correlation coefficients between every two users in the candidate user set $$\Theta_d^D$$

corresponding to the d-th candidate scheduling solution is taken as a correlation coefficient of the candidate user set $$\Theta_d^D, \text{ wherein } C_D^2$$

is the number of correlation coefficients between every two users included in the candidate user set.

Specifically, it is assumed that $$d = 1, \ldots, C_K^D, \text{ and } \Theta_d^D$$

is the user set in the d-th candidate scheduling solution, then the correlation coefficient of $$\Theta_d^D$$

is calculated as $$\rho_{\Theta_d^D} = \left( \prod_{i,j \in \Theta_d^D} \rho_{i,j} \right)^{1/C_D^2}.$$

The method represents the correlation coefficient of the candidate user set by calculating the geometric mean of the correlation coefficients between all two users in the candidate set. This method may equalize the overall correlation impact of each user in the candidate user set for the candidate user set in the correlation coefficient for the candidate user set. Thus, the user in the candidate user set with the smallest correlation coefficient may be selected as the solution for the scheduled users, i.e., $$\Theta = \underset{d=1,\dots,C_K^D}{\operatorname{argmin}} \Theta_d^D.$$

In one example, prior to calculating the geometric mean $$\rho_{\Theta_d^D},$$

if correlation coefficients of candidate user sets corresponding to $$C_K^E$$

candidate scheduling solutions with the number E of scheduled users have been calculated, wherein E<D, calculation of the geometric mean $$\rho_{\Theta_d^D}$$

includes:
the geometric mean $$\rho_{\Theta_d^D}$$

is calculated by the following equation $$\rho_{\Theta_d^D} = \left[ \left( \rho_{\Theta_d^E} \right)^{C_E^2} \cdot \prod_{i,j \in \Theta_d^D, j \notin \Theta_d^E} \rho_{i,j} \right]^{1/C_D^2} \quad (2)$$

wherein, $$\rho_{\Theta_d^E}$$

is the correlation coefficient for the candidate user set $$\Theta_d^E$$

included in the candidate user set $$\Theta_d^D.$$

For example, the number of UEs is set to be K=8, each UE is configured with $N_{UE}=4$ antennas, and the BS is configured with $N_{BS}=64$ antennas. The number of scheduled users is $$D = 4. \ C_K^D$$

combinations of users may be obtained on the basis of the permutation and combination in probability, each combination of users corresponding to a candidate scheduling solution, and the users included in each candidate scheduling solution form a candidate user set, the number of users included in the candidate user set being D.
It is assumed that $$d = 1, \dots, C_K^D, \Theta_d^D$$

is the set of users in the d-th candidate scheduling solution, then the correlation coefficient of $$\Theta_d^D$$

is calculated as $$\rho_{\Theta_d^D} = \left( \prod_{i,j \in \Theta_d^D} \rho_{i,j} \right)^{1/C_D^2}.$$

Prior to calculating the $$\rho_{\Theta_d^D},$$

the correlation coefficient of the user set formed by E (e.g., E=3) users, fewer than D users, in the d-th candidate scheduling solution has been calculated, so that when calculating the correlation coefficient $$\rho_{\Theta_d^D}$$

of the candidate user set corresponding to the current d-th candidate scheduling solution, the calculation can be performed using Equation (2), thereby saving computing resources and increasing the computing speed.

$$\rho_{\Theta_d^E}$$

can be the correlation coefficient $$\rho_{\Theta_d^E}$$

of the candidate user set correspondingly calculated by one-time user scheduling that is closer to the current user scheduling time.

The method is that in the previously calculated correlation coefficient of the candidate user set, the correlation coefficient between two users, namely, each user of the original candidate user set and a new user are added, and then the geometric mean of the correlation coefficients between all two users in the candidate user set after new user addition is calculated as the correlation coefficient of the candidate user set, which reduces the calculation amount and improves the calculation speed. Finally, the candidate user set with the smallest correlation coefficient can be selected as the solution of scheduled users, i.e., $$\Theta = \underset{d=1,\dots,C_K^D}{\operatorname{argmin}} \ \Theta_d^D.$$

Compared with the related art, the present embodiment shows a specific way of calculating the correlation coefficient between every two users; meanwhile, by differing the number of scheduled users, two implementations of selecting scheduled users are given; in addition, when selecting a scheduled user on the basis of the correlation coefficient of a candidate user set, the correlation coefficient of a candidate user set having a previously calculated number of scheduled users smaller than the current number of scheduled users can be used, thereby saving computational resources for calculating the correlation coefficient of the current candidate user set and improving the efficiency of selecting a scheduled user.

Figure 6:
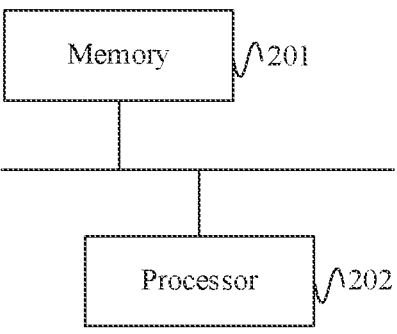
FIG. 6 is a schematic structural diagram of an electronic device according to an embodiment of the present application.

Another embodiment of the present application relates to an electronic device, as shown in FIG. 6, including at least one processor 202; and a memory 201 communicatively connected with the at least one processor 202; wherein the memory 201 stores instructions executable by the at least one processor 202, the instructions being executed by the at least one processor 202 to enable the at least one processor 202 to perform any one of the method embodiments described above.

The memory 201 and the processor 202 are coupled by way of a bus, which may include any number of interconnecting buses and bridges that couple together the various circuits of the one or more processors 202 and the memory 201. The bus may also link together various other circuits such as peripherals, voltage regulators, and power management circuits, which are well known in the art, and therefore, will not be described any further herein. A bus interface provides an interface between a bus and a transceiver. The transceiver may be one element or a plurality of elements, such as a plurality of receivers and a plurality of transmitters, that provide a unit for communicating with various other apparatuses over a transmission medium. Data processed by the processor 202 is transmitted over a wireless medium through the antenna, which further receives the data and transmits the data to the processor 202.

The processor 202 is responsible for managing the bus and general processing, and may also provide various functions including timing, peripheral interfaces, voltage regulation, power management and other control functions. While the memory 201 may be used for storing data used by the processor 202 in performing operations.

Another embodiment of the present application relates to a computer-readable storage medium, storing a computer program. The computer program, when executed by the processor, implements any one of the method embodiments described above.

That is, it can be understood by those skilled in the art that, all or part of the steps in the method of implementing the above embodiments can be accomplished by instructing related hardware through a program, the program is stored in a storage medium and includes instructions for causing a device (which may be a single chip, a chip, etc.) or a processor to perform all or part of the steps of the methods of the various embodiments of the present application. The aforementioned storage medium includes a U disk, a removable hard disk, a Read-Only Memory (ROM), a Random Access Memory (RAM), a magnetic disk or an optical disk and other media capable of storing program codes.

In addition, embodiments of the present application also provide a computer program product including a computer program stored on a non-transient computer-readable storage medium, the computer program including program instructions that, when executed by a computer, cause the computer to execute the method of any one of the method embodiments described above.

It will be understood by those of ordinary skill in the art that the above-described embodiments are specific examples for carrying out the present application, and in practice, various changes in form and detail may be made therein without departing from scope of the present application.

What is claimed is:

1. A user scheduling method in multi-antenna signal transmission, the method being applied to a base station, comprising:
   acquiring channel information of channels that are used by a plurality of users, and constructing, according to the channel information of the channels that are used by the users, a channel information covariance corresponding to each user;
   calculating a correlation coefficient between every two users according to the channel information covariance of each user; and
   selecting a scheduled user on the basis of a number of scheduled users and the correlation coefficient between every two users.

2. The method according to claim 1, wherein acquiring the channel information of the channels that are used by the plurality of users, and constructing, according to the channel information of the channels that are used by the users, the channel information covariance corresponding to each user, comprises:

performing uplink channel estimation on the basis of a pilot signal transmitted by a k-th user to obtain an uplink channel coefficient matrix $H_k \in C^{N_{BS} \times N_k}$, wherein: $0 < N_k \leq N_{UE}$, $N_{BS}$ is a number of antennas configured on a base station, and $N_{UE}$ is a number of antennas configured on a user equipment; and constructing a channel coefficient covariance matrix $$R_k = H_k H_k^H$$

of the k-th user on the basis of the uplink channel coefficient matrix $H_k$, wherein, $$H_k^H$$

is a conjugate transpose matrix of $H_k$.

3. The method according to claim 1, wherein acquiring the channel information of the channels that are used by the plurality of users, and constructing, according to the channel information of the channels that are used by the users, the channel information covariance corresponding to each user, comprises:

receiving, on the basis of $Q_k$ broadcast beams with a forming vector of $A_k=[a_1, \ldots, a_{Q_k}] \in C^{N_{BS} \times Q_k}$ transmitted to a k-th user, a channel power value $U_k=\text{diag}(u_1, \ldots, u_{Q_k})$ for receiving the broadcast beams fed back by the k-th user; wherein: $N_{BS}$ is a number of antennas configured on the base station; and constructing a channel coefficient covariance matrix $$R_k = A_k U_k A_k^H$$

of the k-th user on the basis of the channel power value $U_k$ and the forming vector $A_k$, wherein:

$$A_k^H$$

is a conjugate transpose matrix of $A_k$.

4. The method according to claim 1, wherein acquiring the channel information of the channels that are used by the plurality of users, and constructing, according to the channel information of the channels that are used by the users, the channel information covariance corresponding to each user, comprises:

receiving, on the basis of a pilot signal for measuring a downlink channel transmitted to a k-th user, a matrix codebook $V_k \in C^{L_k \times N_{BS}}$ of the downlink channel fed back by the user, wherein: $0 < L_k \leq N_{UE}$, $N_{BS}$ is a number of antennas configured on a base station, and $N_{UE}$ is a number of antennas configured on a user equipment; and constructing a channel coefficient covariance matrix $$R_k = V_k^H V_k$$

of the k-th user on the basis of the matrix codebook $V_k$, wherein:

$$V_k^H$$

is a conjugate transpose matrix of $V_k$.

5. The method according to claim 1, wherein calculating the correlation coefficient between every two users according to the channel information covariance of each user, comprises:

calculating a correlation coefficient $\rho_{i,j}$ between an i-th user and a j-th user according to $$\rho_{i,j} = \frac{tr(R_i R_j^H)}{\|R_i\|_F \|R_j\|_F};$$

wherein $tr(\bullet)$ represents a trace of a matrix, $\|\bullet\|_F$ represents a norm of the matrix, and $R_i$ and $R_j$ are channel information covariances corresponding to the i-th user and the j-th user, respectively.

6. The method according to claim 5, wherein selecting the scheduled user on the basis of the number of scheduled users and the correlation coefficient between every two users, comprises:

selecting, upon the condition that the number of scheduled users is not greater than 2, two users with the smallest correlation coefficient as scheduled users; and calculating, upon the condition that the number of scheduled users is greater than 2, a correlation coefficient of each candidate user set on the basis of the correlation coefficient between every two users, and selecting users in the candidate user set with the smallest correlation coefficient as the scheduled users.

7. The method according to claim 6, wherein calculating, upon the condition that the number of scheduled users is greater than 2, the correlation coefficient of each candidate user set on the basis of the correlation coefficient between every two users, comprises:

constructing $$C_K^D$$

candidate scheduling solutions on the basis of a total number K of existing users and the number D of scheduled users, and users comprised in each candidate scheduling solution forming one candidate user set; and taking a geometric mean $$\rho_{\Theta_d^D} = \left( \prod_{i,j \in \Theta_d^D} \rho_{i,j} \right)^{1/C_D^2}$$

of correlation coefficients between every two users in a candidate user set $$\Theta_d^D$$

corresponding to a d-th candidate scheduling solution as a correlation coefficient of the candidate user set $$\Theta_d^D,$$

wherein $$C_D^2$$

is a number of correlation coefficients between any two users comprised in the candidate user set.

8. The method according to claim 7, wherein, upon the condition that prior to calculating the geometric mean $$\rho_{\Theta_d^D},$$

a correlation coefficient of each candidate user set corresponding to $$C_K^2$$

candidate scheduling solutions with the number of scheduled users being E have been calculated, wherein E<D, calculating the geometric mean $$\rho_{\Theta_d^D}$$

comprises:

calculating the geometric mean $$\rho_{\Theta_d^D}$$

by $$\rho_{\Theta_d^D} = \left[ \left( \rho_{\Theta_d^E} \right)^{C_E^2} \prod_{i,j \in \Theta_d^D, j \notin \Theta_d^E} \rho_d \right]^{1/C_D^2}$$

wherein, $$\rho_{\Theta_d^E}$$

is a correlation coefficient of a candidate user set $$\Theta_d^E$$

comprised in the candidate user set $$\Theta_d^D.$$

9. An electronic device, comprising:

at least one processor; and, a memory communicatively connected with the at least one processor; wherein, the memory stores instructions executable by the at least one processor, the instructions executed by the at least one processor to enable the at least one processor to perform the user scheduling method in multi-antenna signal transmission according to claim 1.

10. A non-transitory computer-readable storage medium storing a computer program, wherein the computer program, when executed by a processor, implements the user scheduling method in multi-antenna signal transmission according to claim 1.

\* \* \* \* \*